US011592288B1

(12) United States Patent
Tsuzaki et al.

(10) Patent No.: US 11,592,288 B1
(45) Date of Patent: Feb. 28, 2023

(54) ULTRASOUND TRANSMITTING AND RECEIVING DEVICE AND COMPUTER READABLE MEDIUM STORING ULTRASOUND TRANSMITTING AND RECEIVING PROGRAM (71) Applicant: HONDA MOTOR CO., LTD., Tokyo (JP)

(72) Inventors: Kazuhiro Tsuzaki, Wako (JP); Toshitsugu Sakakibara, Wako (JP); Toshiaki Ohashi, Kamakura (JP); Tsukasa Ishida, Kamakura (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/473,314

(22) Filed: Sep. 13, 2021

(51) Int. Cl.
    *G01N 29/24* (2006.01)
    *G01B 17/00* (2006.01)
(52) U.S. Cl.
    CPC .............. *G01B 17/00* (2013.01); *G01N 29/24* (2013.01); *G01N 2291/02854* (2013.01); *G01N 2291/045* (2013.01); *G01N 2291/2691* (2013.01)
(58) Field of Classification Search
    CPC ......... G01N 29/24; G01N 2291/02854; G01N 2291/045; G01N 2291/2691; G01B 17/00
    See application file for complete search history.

(56) References Cited

U.S. PATENT DOCUMENTS

| 10,724,857 B1* | 7/2020 | Brahmeshwarkar ........................ G01N 29/227 |
| 2009/0183572 A1* | 7/2009 | Zendehroud ............ G01L 5/246 73/862.21 |
| 2020/0039038 A1* | 2/2020 | Sakakibara ......... B25B 23/1425 |
| 2020/0041369 A1 | 2/2020 | Sakakibara et al. |

FOREIGN PATENT DOCUMENTS

JP          2020-20763 A       2/2020

* cited by examiner

Primary Examiner — Suman K Nath
(74) Attorney, Agent, or Firm — Birch, Stewart, Kolasch & Birch, LLP

(57) ABSTRACT

An ultrasound transmitting and receiving device that can determine whether a contact state between a probe and a bolt is normal without relying on the skill of an operator is provided. The ultrasound transmitting and receiving device includes a probe control unit, an auxiliary storage device, and a contact state determination unit. The probe control unit causes a probe to transmit ultrasound to a bolt, and causes the probe to receive an echo of the transmitted ultrasound. The auxiliary storage device stores one or more pieces of comparison data to be compared with echo data indicating the echo received by the probe. The contact state determination unit compares the echo data with the comparison data, and determines a contact state between the probe and the bolt based on a comparison result.

9 Claims, 12 Drawing Sheets

ULTRASOUND TRANSMITTING AND RECEIVING DEVICE AND COMPUTER READABLE MEDIUM STORING ULTRASOUND TRANSMITTING AND RECEIVING PROGRAM

TECHNICAL FIELD

The present disclosure relates to an ultrasound transmitting and receiving device that causes a probe to transmit and receive ultrasound.

BACKGROUND ART

There is a bolt axial force measurement device that measures an axial force of a bolt using a probe that emits ultrasound (for example, Patent Literature 1). By managing the tightening of bolts depending on axial force values using ultrasound, variation in the axial force values can be reduced. Reduction in variation in the axial force values is expected to lead to reduction in the weight and cost of bolts and performance improvement of a tightener.

However, in order to measure the axial force of a bolt using a probe, it is necessary to determine whether a contact state between the probe and the bolt is normal. A determination as to whether the contact state between the probe and the bolt is normal has conventionally relied on a judgment by a skilled operator.

CITATION LIST

Patent Literature

Patent Literature 1: JP 2020-20763 A

SUMMARY OF INVENTION

Technical Problem

It is an object of the present disclosure to provide an ultrasound transmitting and receiving device that determines a contact state between a probe and a bolt without relying on the skill of an operator.

Solution to Problem

An ultrasound transmitting and receiving device according to the present disclosure includes
circuitry to cause a probe to transmit ultrasound to a bolt, and cause the probe to receive an echo of the transmitted ultrasound; and
a memory to store one or more pieces of comparison data to be compared with echo data that is based on the echo received by the probe,
wherein the circuitry compares the echo data with the comparison data, and determines a contact state between the probe and the bolt based on a comparison result.

Advantageous Effects of Invention

An ultrasound transmitting and receiving device of the present disclosure includes a comparison data storage unit and a contact state determination unit, so that it is possible to provide the ultrasound transmitting and receiving device that can determine a contact state between a probe and a bolt without relying on the skill of an operator.

DESCRIPTION OF EMBODIMENTS

An embodiment will be described hereinafter with reference to the drawings. Throughout the drawings, the same or corresponding portions are denoted by the same reference sign. In the description of the embodiment, description of the same or corresponding portions will be omitted or simplified as appropriate.

In the following embodiment, "unit" may be interpreted as "circuit", "step", "procedure", "process", or "circuitry" as appropriate.

First Embodiment

Referring to FIGS. 1 to 12, an ultrasound transmitting and receiving device 100 of a first embodiment will be described. The ultrasound transmitting and receiving device 100 is realized as a bolt axial force measuring device that calculates an axial force of a bolt using ultrasound. The ultrasound transmitting and receiving device 100 uses an echo of ultrasound emitted by a probe 200 placed on a bolt to determine whether the probe 200 for measuring an axial force of the bolt is properly in contact with the bolt, and outputs a determination result. Therefore, according to the ultrasound transmitting and receiving device 100, the axial force of the bolt can be measured accurately without relying on the skill of an operator who handles the bolt axial force measuring device. The ultrasound transmitting and receiving device 100 will be described in detail below.

*Description of Configurations*

Figure 1:
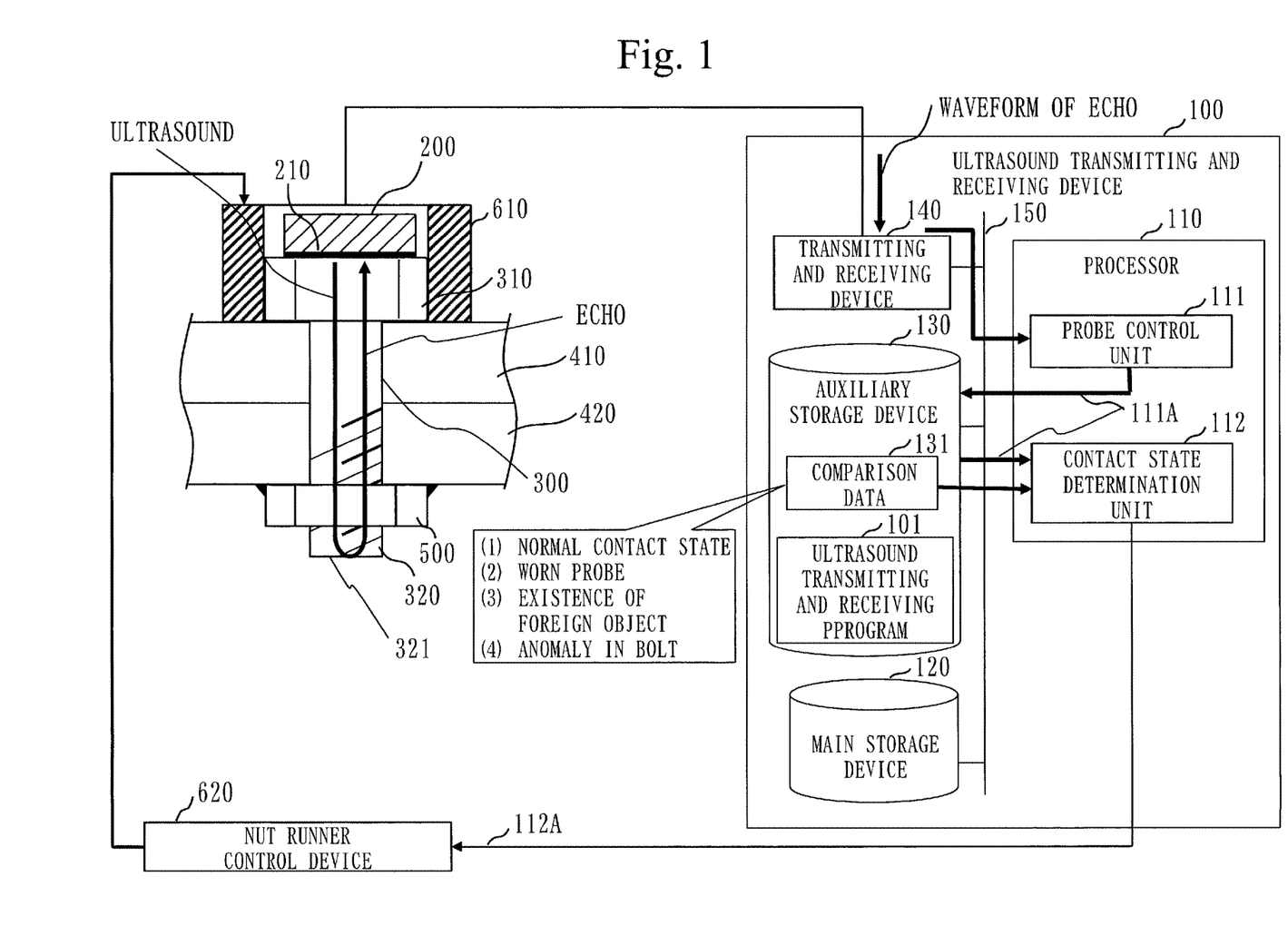
FIG. 1 is a diagram of a first embodiment and illustrates a hardware configuration of an ultrasound transmitting and receiving device 100.

FIG. 1 illustrates a hardware configuration of the ultrasound transmitting and receiving device 100. The ultrasound transmitting and receiving device 100 is a computer. The ultrasound transmitting and receiving device 100 includes a processor 110. In addition to the processor 110, the ultrasound transmitting and receiving device 100 includes other hardware components, such as a main storage device 120, an auxiliary storage device 130, and a transmitting and receiving device 140. The processor 110 is connected with the other hardware components via signal lines 150 and controls the other hardware components.

The ultrasound transmitting and receiving device 100 includes a probe control unit 111 and a contact state determination unit 112 as functional elements. The functions of the probe control unit 111 and the contact state determination unit 112 are realized by an ultrasound transmitting and receiving program 101. The contact state determination unit 112 is connected with a nut runner control device 620, and transmits a comparison result signal 112A to the nut runner control device 620. The nut runner control device 620 controls a nut runner 610 in accordance with the comparison result signal 112A. The ultrasound transmitting and receiving program 101 is stored in the auxiliary storage device 130. The processor 110 is a device that executes the ultrasound transmitting and receiving program 101. The processor 110 is an integrated circuit (IC) that performs operational processing. Specific examples of the processor 110 are a central processing unit (CPU), a digital signal processor (DSP), and a graphics processing unit (GPU).

The main storage device 120 is a storage device. Specific examples of the main storage device 120 are a static random access memory (SRAM) and a dynamic random access memory (DRAM). The main storage device 120 holds operational results of the processor 110.

The main storage device 120 stores comparison data, which is read by the processor 110 from the auxiliary storage device 130. Like the auxiliary storage device 130 to be described later, the main storage device 120 is a comparison data storage unit.

The auxiliary storage device 130 is a storage device to store data in a non-volatile manner. The auxiliary storage device 130 is the comparison data storage unit. A specific example of the auxiliary storage device 130 is a hard disk drive (HDD). Alternatively, the auxiliary storage device 130 may be a portable recording medium, such as a Secure Digital (SD, registered trademark) memory card, a NAND flash, a flexible disk, an optical disc, a compact disc, a Blu-ray (registered trademark) disc, or a digital versatile disc (DVD).

The auxiliary storage device 130 may be a memory different from the SD memory card.

The auxiliary storage device 130 stores the ultrasound transmitting and receiving program 101. The auxiliary storage device 130 also stores one or more pieces of comparison data 131 to be compared with echo data 111A that is based on an echo received by the probe 200. The echo data 111A and the comparison data 131 will be described later.

Figure 5:
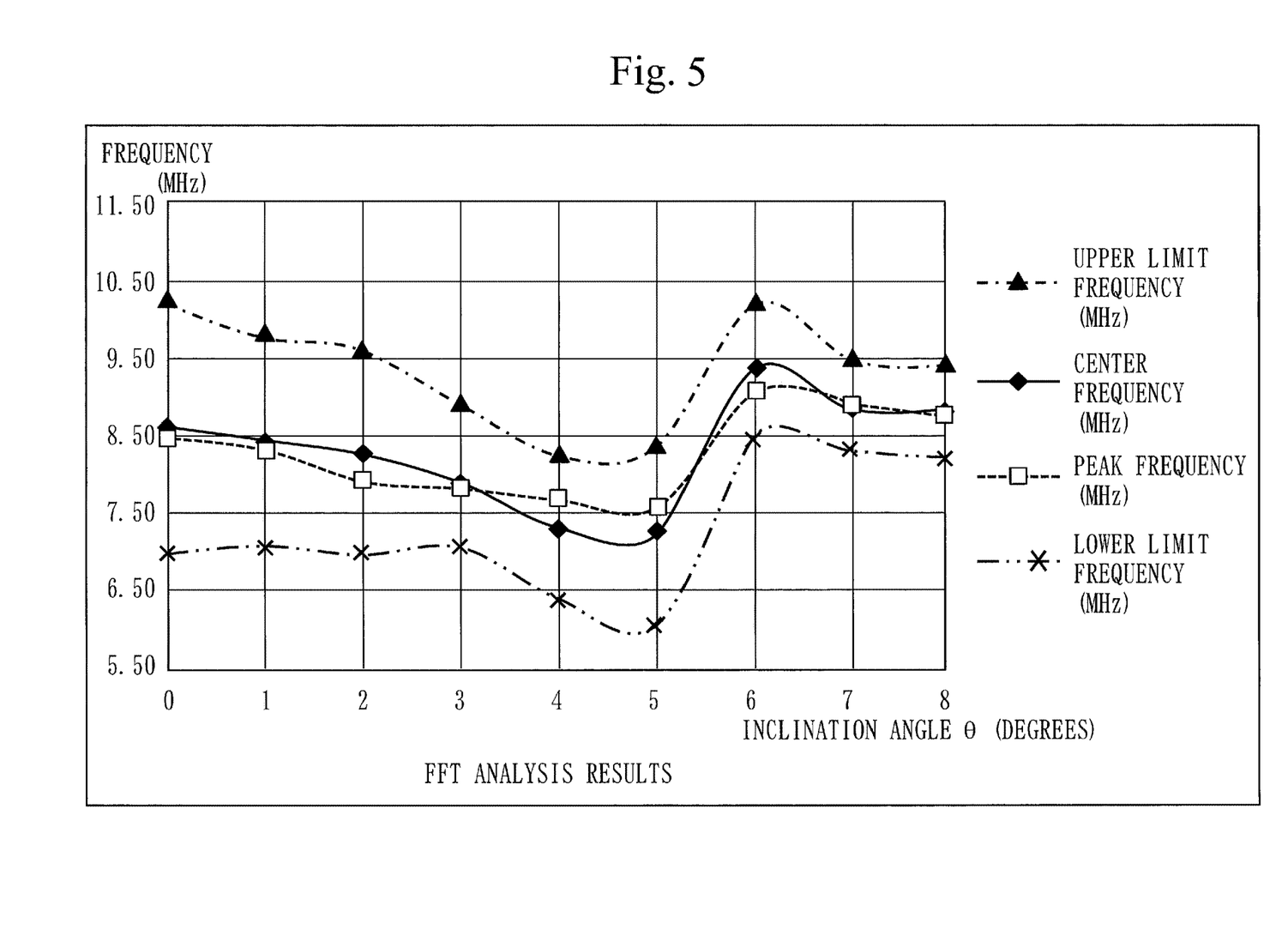
FIG. 5 is a diagram of the first embodiment and illustrates measurement results of FIG. 4.

The auxiliary storage device 130, which is the comparison data storage unit, stores, as the comparison data 131, at least one of normal data indicating a normal contact state between the probe and the bolt and non-normal data indicating a non-normal contact state of the probe. For example, {upper limit frequency, center frequency, peak frequency, and lower limit frequency} when an inclination angle θ is 0 degrees in FIG. 5 to be described later are normal data indicating a normal contact state between the probe and the bolt. {Upper limit frequency, center frequency, peak frequency, and lower limit frequency} when the inclination angle θ is 4 degrees in FIG. 5 are non-normal data indicating a non-normal contact state between the probe and the bolt.

The transmitting and receiving device 140 causes the probe 200 to transmit ultrasound, and receives from the probe 200 an echo received by the probe 200. The transmitting and receiving device 140 causes the probe 200 to transmit ultrasound, and receives from the probe 200 an echo of the ultrasound transmitted by the probe 200 by being controlled by the probe control unit 111.

The ultrasound transmitting and receiving program 101 is a program that causes a computer to execute each process, each procedure, or each step, where "unit" such as in the probe control unit 111 and the contact state determination unit 112 is interpreted as "process", "procedure", or "step".

An ultrasound transmitting and receiving method is a method performed by execution of the ultrasound transmitting and receiving program 101 by the ultrasound transmitting and receiving device 100, which is a computer. The ultrasound transmitting and receiving program 101 may be stored and provided in a computer readable recording medium.

As illustrated in FIG. 1, the probe 200 is placed on a bolt head 310 of a bolt 300 through the intermediary of a contact medium 210. The contact medium 210 is a medium for improving conveyance of ultrasound. In FIG. 1, a nut 500 is fixed to a second member 420 by welding. Note that welding is an example. For example, an internal thread may be formed in a first member 410 to be described later and the second member 420. The first member 410 and the second member 420 are placed on top of each other. A through hole formed in the first member 410 and a through hole formed in the second member 420 communicate with each other, and a bolt axis 320 of the bolt 300 is passed through each of the communicating through holes. The nut runner 610 fits around the bolt head 310. In FIG. 1, it is assumed that the bolt 300 is fitted into the nut 500 but is not tightened into the nut 500. That is, it is assumed that no axial force is generated in the bolt 300 in the state of FIG. 1. Ultrasound emitted by the probe 200 is reverberated by a bolt bottom portion 321 and becomes an echo, which is received by the probe 200.

Figure 2:
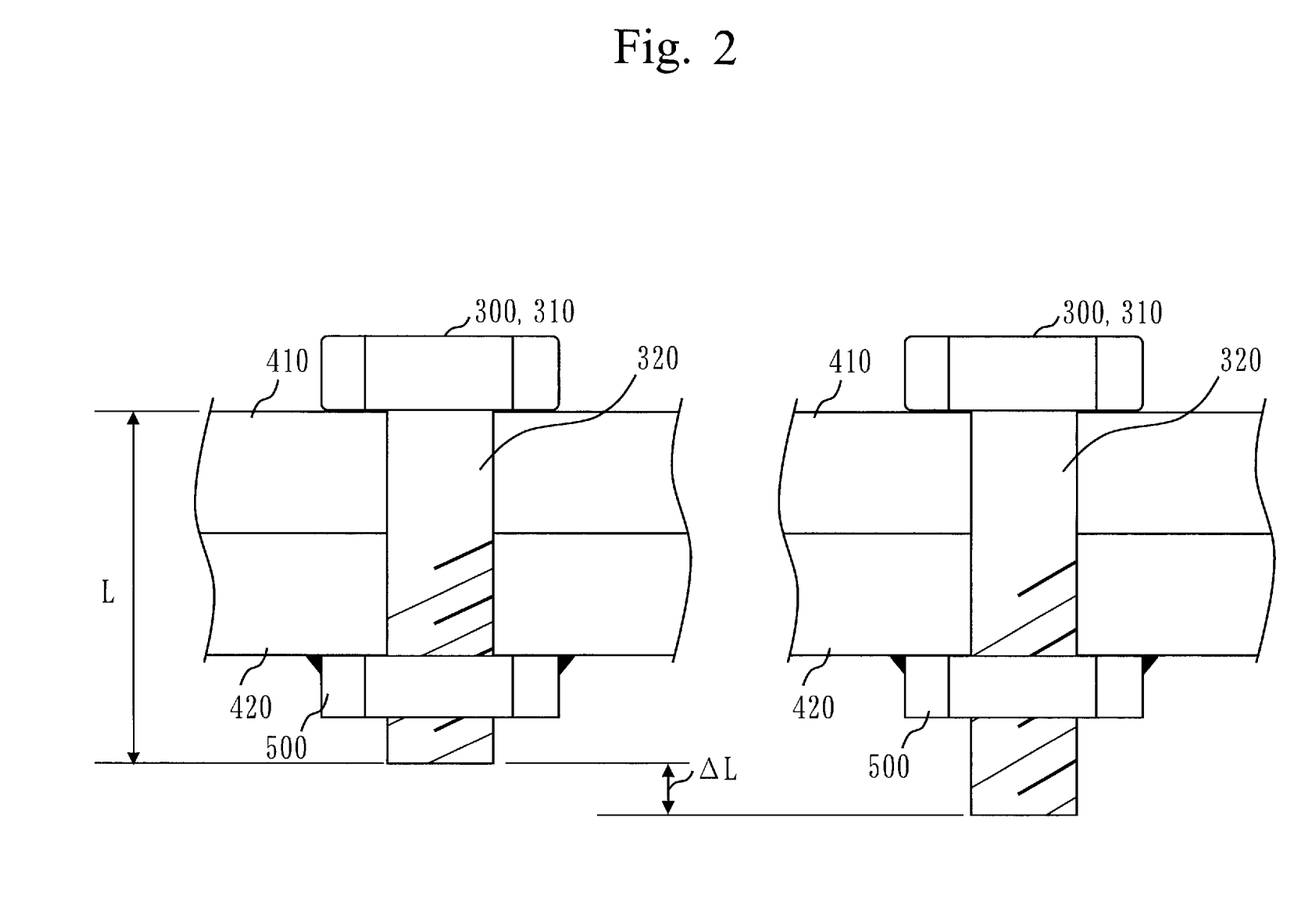
FIG. 2 is a diagram of the first embodiment and illustrates the principle of measurement of an axial force of a bolt with ultrasound.

FIG. 2 illustrates the principle of measurement of an axial force of a bolt with ultrasound. Referring to FIG. 2, the principle of measurement of an axial force of a bolt with ultrasound will be briefly described. A size L on the left side of FIG. 2 is a length when no axial force is generated in the bolt 300. The right side of FIG. 2 indicates a state in which an axial force is generated in the bolt 300. When the axial force is generated in the bolt 300, the bolt axis 320 lengthens by only ΔL from the state of the left side of FIG. 2 in which no axial force is generated. The bolt axial force measurement device using ultrasound measures "L+ΔL" with ultrasound emitted by the probe 200, and obtains ΔL by subtracting L, which is known, from "L+ΔL". The bolt axial force measurement device converts the obtained ΔL into an axial force. At this time, in order to obtain the axial force accurately, the probe 200 needs to be in contact with the bolt 300 properly. For this reason, the ultrasound transmitting and receiving device 100 determines whether the probe 200 is in contact with the bolt 300 properly, based on an echo of ultrasound emitted by the probe 200.

*Description of Operation*

Figure 3:
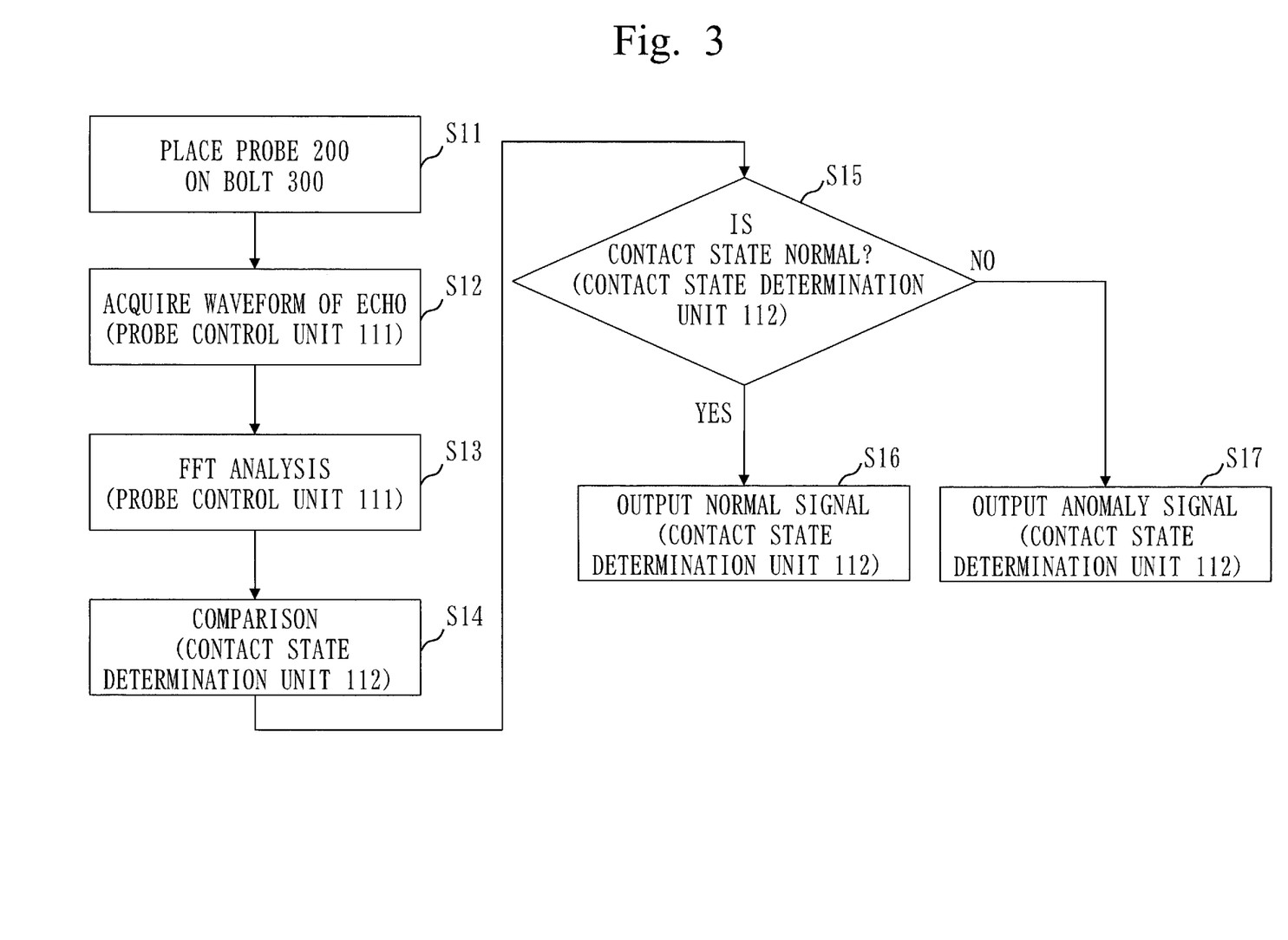
FIG. 3 is a diagram of the first embodiment and is a flowchart of operation of the ultrasound transmitting and receiving device 100.

FIG. 3 is a flowchart illustrating operation of the ultrasound transmitting and receiving device 100. Referring to FIG. 3, the operation of the ultrasound transmitting and receiving device 100 will be described. In each step of FIG. 3, the unit that performs the operation of that step is indicated in parentheses.

<Step S11>

In step S11, the probe 200 is placed on the bolt head 310. The probe 200 is attached to the nut runner 610. When the nut runner 610 connects with the bolt head 310 of the bolt 300, the probe 200 is simultaneously placed on the bolt head 310.

<Step S12>

In step S12, the probe control unit 111 causes the probe 200 to transmit ultrasound to the bolt 300, and causes the probe 200 to receive an echo of the transmitted ultrasound.

In step S14 to be described later, the contact state determination unit 112 compares the echo data 111A with the comparison data 131, and determines a contact state between the probe 200 and the bolt based on a comparison result. Note that the "contact state" includes a state in which the probe 200 is not in contact with the bolt 300. The state in which the probe 200 is not in contact with the bolt 300 includes, for example, a state in which the probe 200 is not in contact with the contact medium 210, or a state in which the probe 200 is in contact with the contact medium 210 but the contact medium 210 is not in contact with the bolt 300.

The probe control unit 111 causes the probe 200 to transmit ultrasound via the transmitting and receiving device 140, and receives an echo of the ultrasound via the probe 200 and the transmitting and receiving device 140.

<Step S13>

In step S13, the probe control unit 111 performs fast Fourier transform (FFT) analysis on a signal waveform of the received echo. In the following, FFT analysis results on the signal waveform of an echo will be described as the echo data 111A. The probe control unit 111 stores the echo data 111A in the auxiliary storage device 130.

<Step S14>

In step S14, the contact state determination unit 112 compares the echo data 111A with the comparison data 131, and determines the contact state between the probe 200 and the bolt based on a comparison result. Specifically, a determination is made as described below.

The auxiliary storage device 130, which is the comparison data storage unit, stores FFT analysis data obtained by performing FFT analysis on an echo of ultrasound as the comparison data 131. The probe control unit 111 performs FFT analysis on an echo received by the probe 200, and generates analysis results as the echo data 111A.

Specifically, the contact state determination unit 112 reads the echo data 111A and the comparison data 131 from the auxiliary storage device 130, and compares the echo data 111A with the comparison data 131. The comparison data 131 is data obtained by performing FFT analysis on an echo of ultrasound. The comparison data 131 is data mainly such as (A) to (D) described below. Each of (A) to (D) of the comparison data 131 can be expressed as a set having, as elements, an upper limit frequency, a center frequency, a peak frequency, and a lower limit frequency in a frequency spectrum of FFT analysis. The comparison data 131 is stored in the auxiliary storage device 130 in the form of a database of FFT analysis results.

(A) The comparison data 131 is data of FFT analysis results on an echo when the contact state between the probe and the bolt is normal.

(B) The comparison data 131 is data of FFT analysis results on an echo of ultrasound emitted by a worn probe.

(C) The comparison data 131 is data of FFT analysis results on an echo of ultrasound emitted by a probe when there is a foreign object between the probe and a bolt.

(D) The comparison data 131 is data of FFT analysis results on an echo of ultrasound emitted by a probe when there is an anomaly in a bolt on which the probe is placed.

<Step S15>

In step S15, the contact state determination unit 112 determines whether the contact state between the probe 200 and the bolt 300 is normal, based on a result of comparison between the echo data 111A and the comparison data 131. If the contact state determination unit 112 determines that the contact state is normal, the process proceeds to step S16. If the contact state determination unit 112 determines that the contact state is not normal, the process proceeds to step S17.

<Step S16>

In step S16, the contact state determination unit 112 transmits a normal signal as the comparison result signal 112A to the nut runner control device 620. Upon receiving the normal signal as the comparison result signal 112A, the nut runner control device 620 causes the nut runner 610 to continue the process of tightening the bolt 300. In this case, the probe 200 is used for measurement of an axial force of the bolt 300.

<Step S17>

In step S17, upon determining that the contact state between the probe 200 and the bolt 300 is not normal, the contact state determination unit 112 outputs the comparison result signal 112A indicating the comparison result to the nut runner 610 that tightens the bolt. Specifically, the contact state determination unit 112 transmits an anomaly signal as the comparison result signal 112A to the nut runner control device 620. Upon receiving the anomaly signal as the comparison result signal 112A, the nut runner control device 620 causes the nut runner 610 to terminate the process of tightening the bolt 300.

<Specific Examples of the Comparison Data 131>

Referring to FIGS. 4 to 11, the comparison data 131 will be described specifically.

Figure 4:
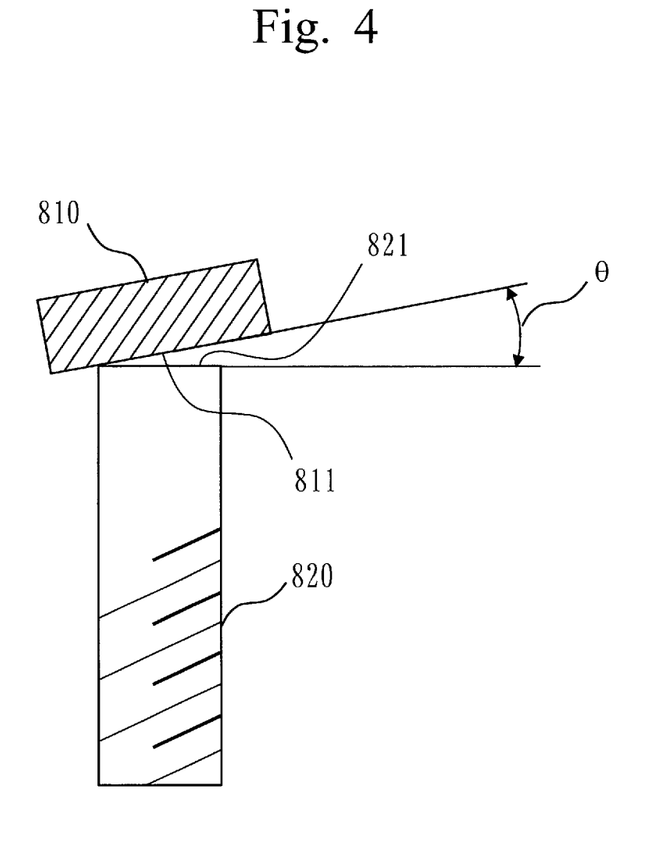
FIG. 4 is a diagram of the first embodiment and illustrates measurement of echo data 111A.

FIG. 4 illustrates measurement by changing an angle θ between an end face 821 of a test bolt 820 and an ultrasound emitting face 811 of a test probe 810 in increments of one degree so as to obtain signal waveforms of echoes and their echo data 111A. The angle θ will be hereinafter referred to as the inclination angle θ.

FIG. 5 indicates measurement results of FIG. 4. The horizontal axis is the inclination angle θ and the unit is degrees. The vertical axis indicates frequencies in FFT analysis and the unit is MHz. The legends of graph types are indicated on the right side of FIG. 5. A dash-dot-dash line indicates the upper limit frequency. A solid line indicates the center frequency. A dotted line indicates the peak frequency. A dash-dot-dot-dash line indicates the lower limit frequency.

Figure 6:
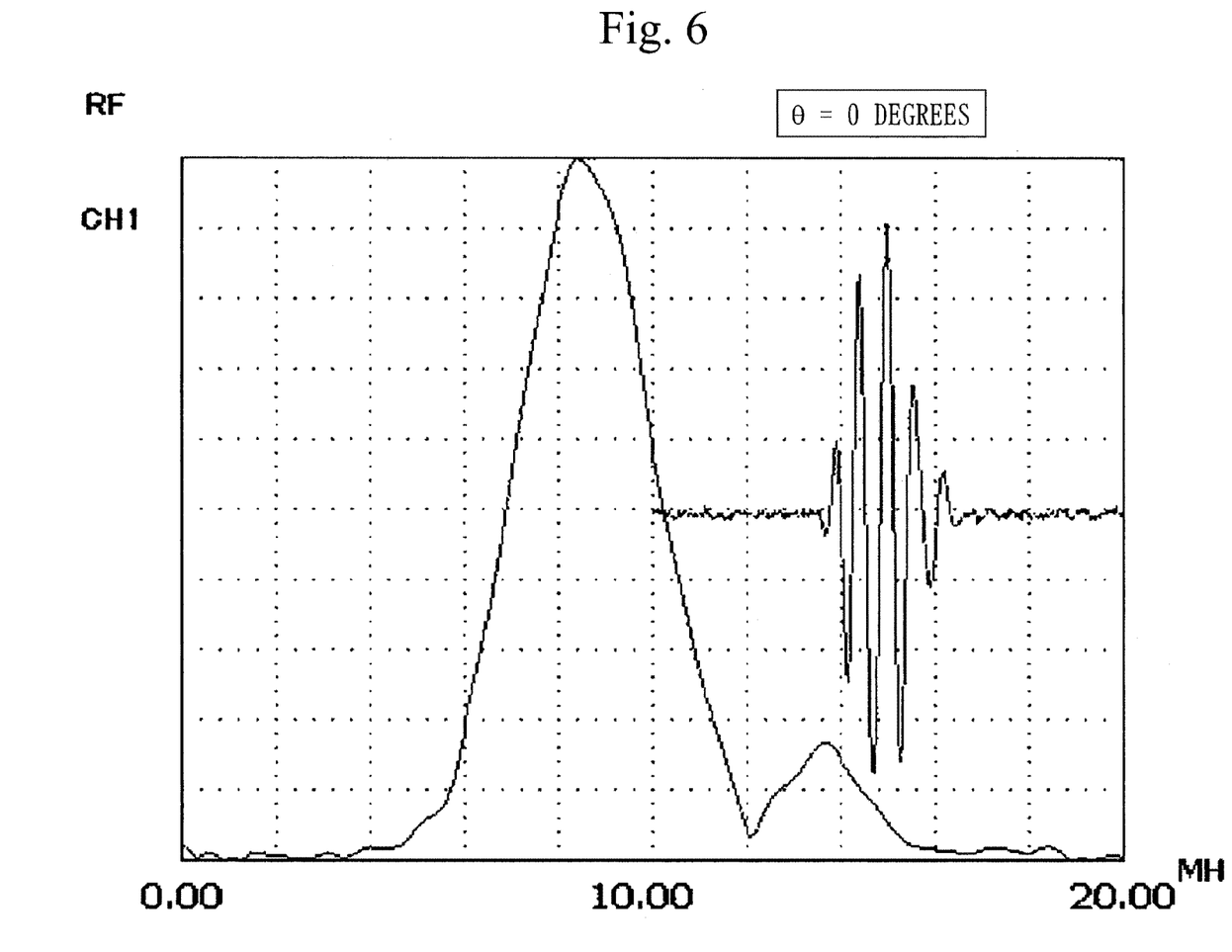
FIG. 6 is a diagram of the first embodiment and illustrates a frequency spectrum of FFT analysis results when an inclination angle θ is 0 degrees.

FIG. 6 indicates a frequency spectrum of FFT analysis results when the inclination angle θ is 0 degrees. The results in FIG. 6 are the values in FIG. 5 when the inclination angle θ is 0 degrees. The right side of FIG. 6 is a raw waveform on which the FFT analysis results are based.

Figure 7:
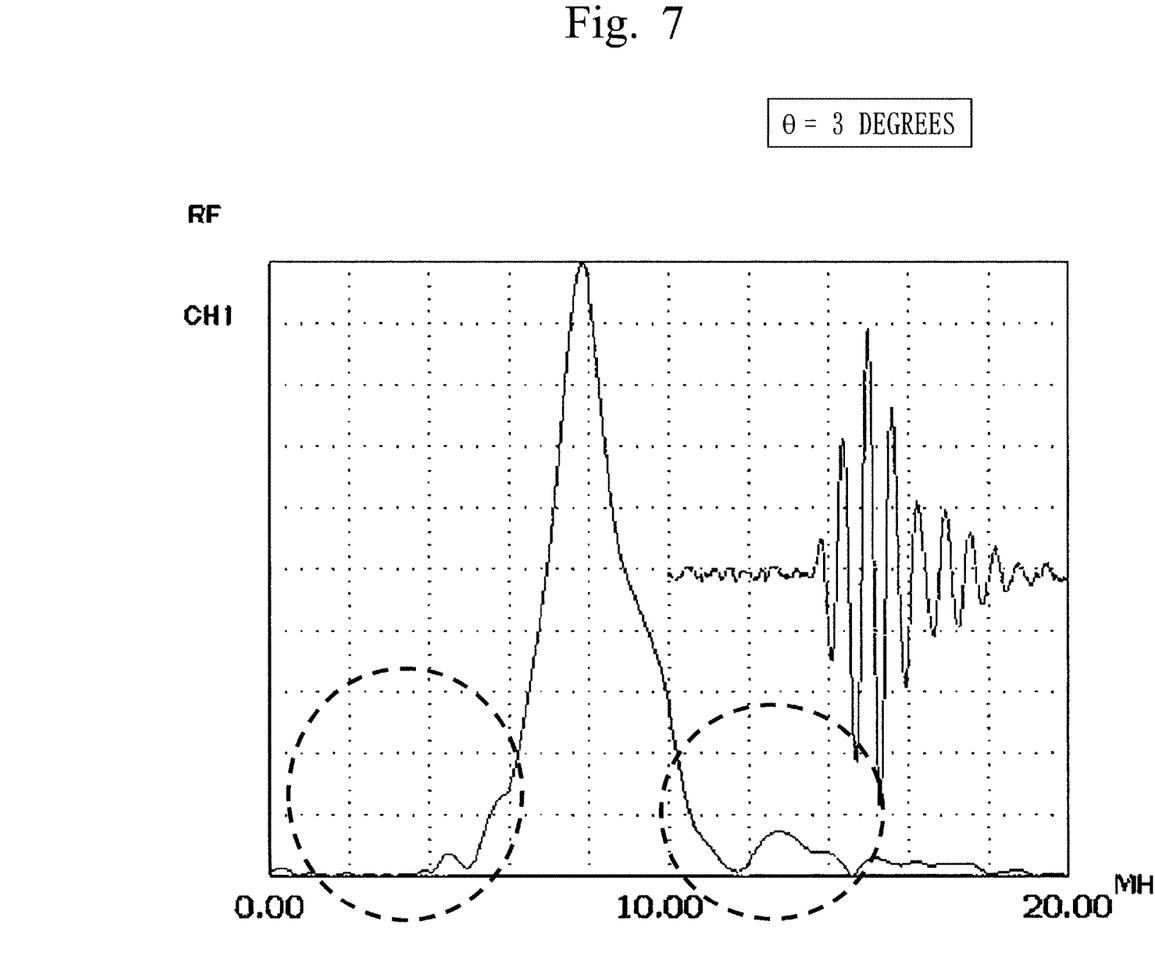
FIG. 7 is a diagram of the first embodiment and illustrates a frequency spectrum of FFT analysis results when the inclination angle θ is 3 degrees.

FIG. 7 indicates a frequency spectrum of FFT analysis results when the inclination angle θ is 3 degrees. The results in FIG. 7 are the values in FIG. 5 when the inclination angle θ is 3 degrees. The right side of FIG. 7 is a raw waveform on which the FFT analysis results are based.

Figure 8:
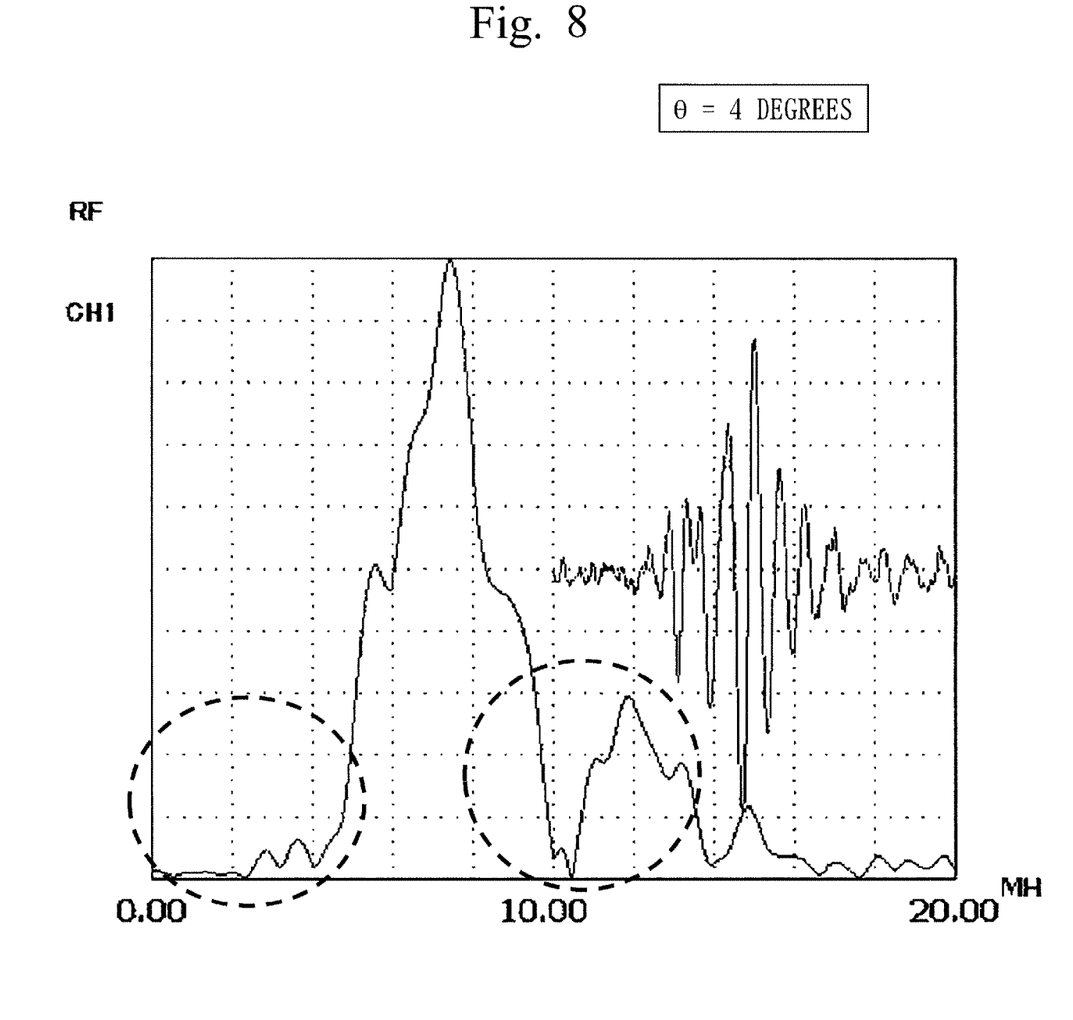
FIG. 8 is a diagram of the first embodiment and illustrates a frequency spectrum of FFT analysis results when the inclination angle θ is 4 degrees.

FIG. 8 indicates a frequency spectrum of FFT analysis results when the inclination angle θ is 4 degrees. The results in FIG. 8 are the values in FIG. 5 when the inclination angle θ is 4 degrees. The right side of FIG. 8 is a raw waveform on which the FFT analysis results are based.

Figure 9:
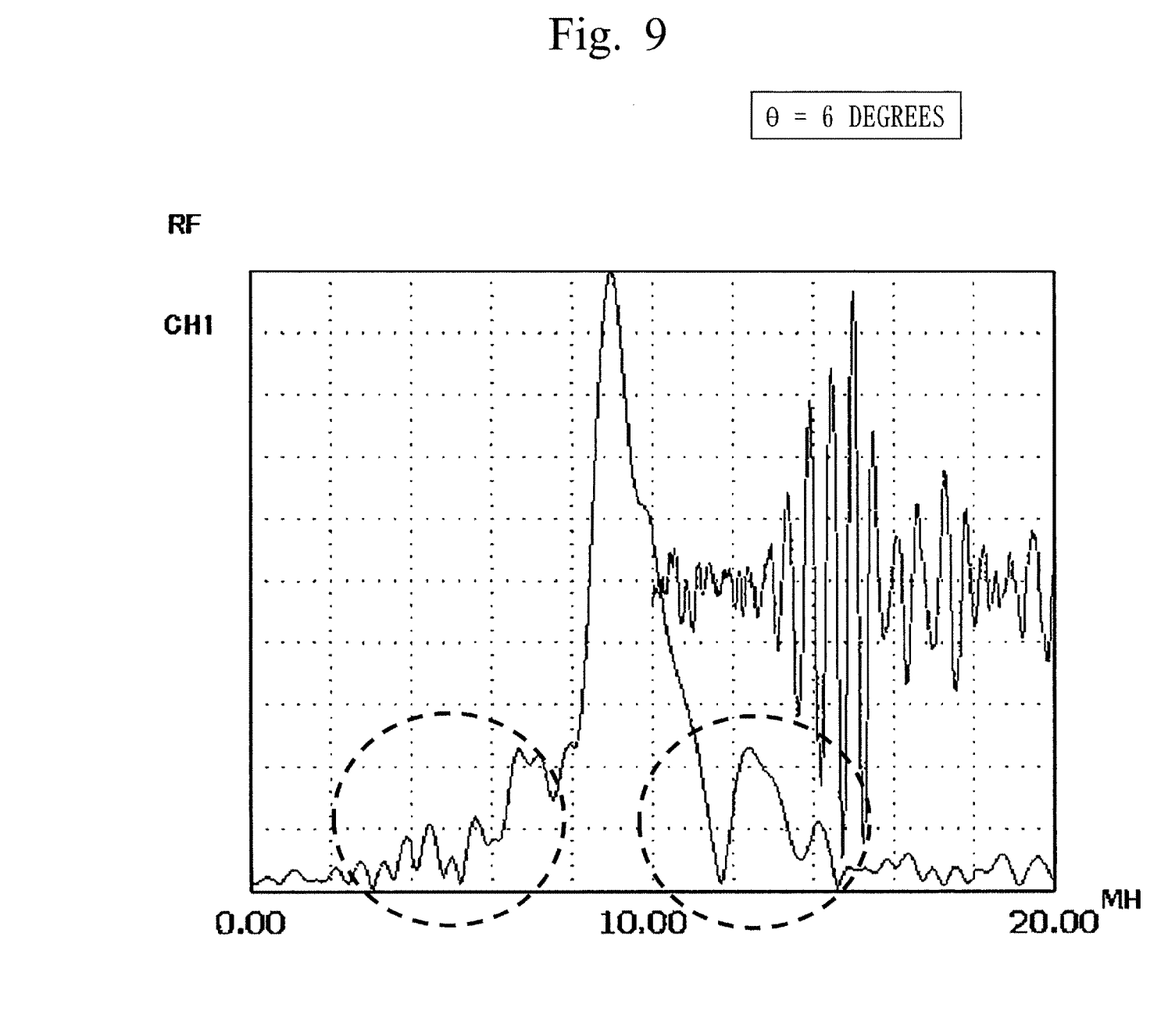
FIG. 9 is a diagram of the first embodiment and illustrates a frequency spectrum of FFT analysis results when the inclination angle θ is 6 degrees.

FIG. 9 indicates a frequency spectrum of FFT analysis results when the inclination angle θ is 6 degrees. The results in FIG. 9 are the values in FIG. 5 when the inclination angle θ is 6 degrees. The right side of FIG. 9 is a raw waveform on which the FFT analysis results are based.

Figure 10:
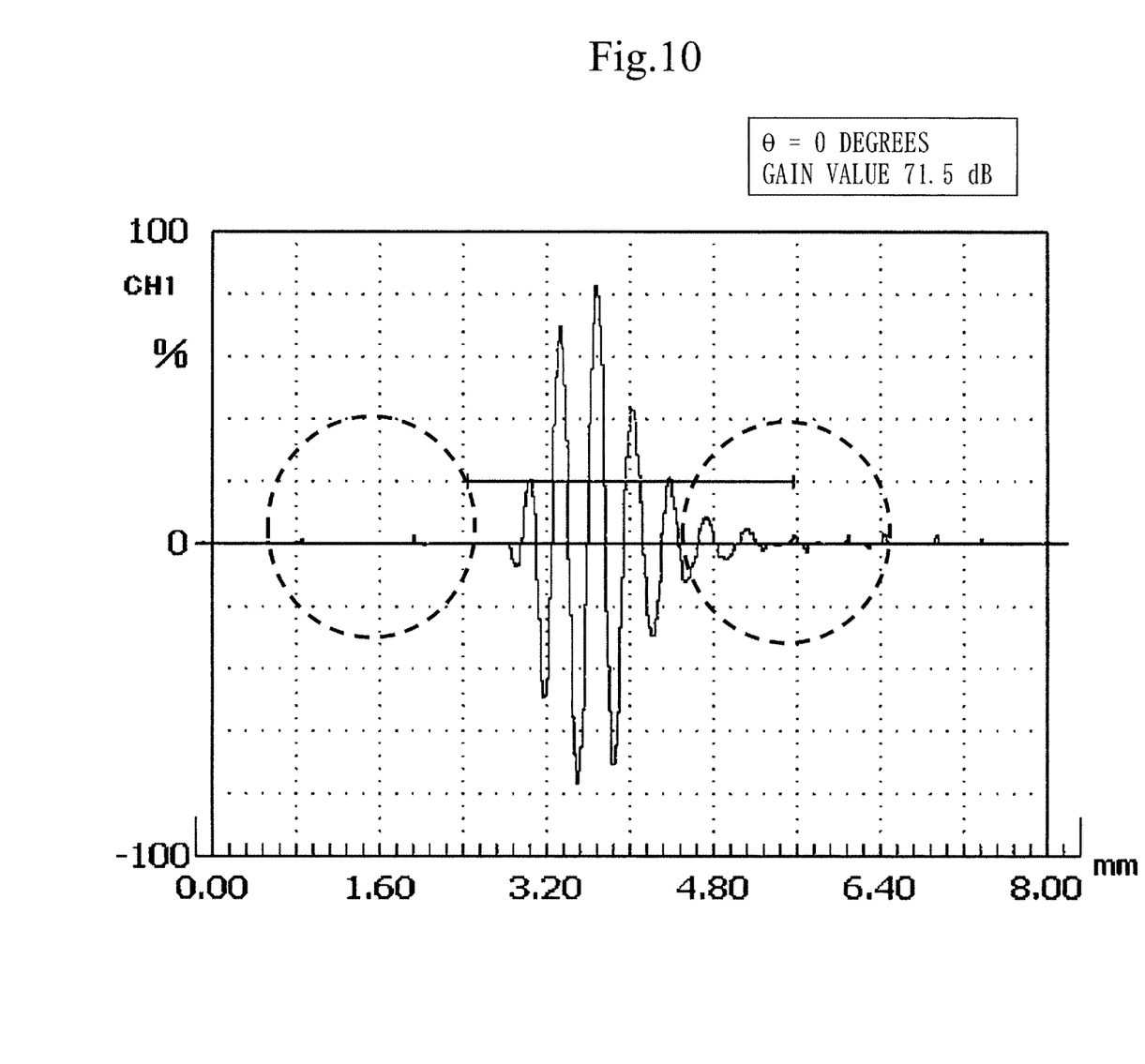
FIG. 10 is a diagram of the first embodiment and illustrates a raw waveform with a gain value of 71.5 dB when the inclination angle θ is 0 degrees.

FIG. 10 indicates a raw waveform with a gain value of 71.5 dB on which FFT analysis when the inclination angle θ is 0 degrees is based.

Figure 11:
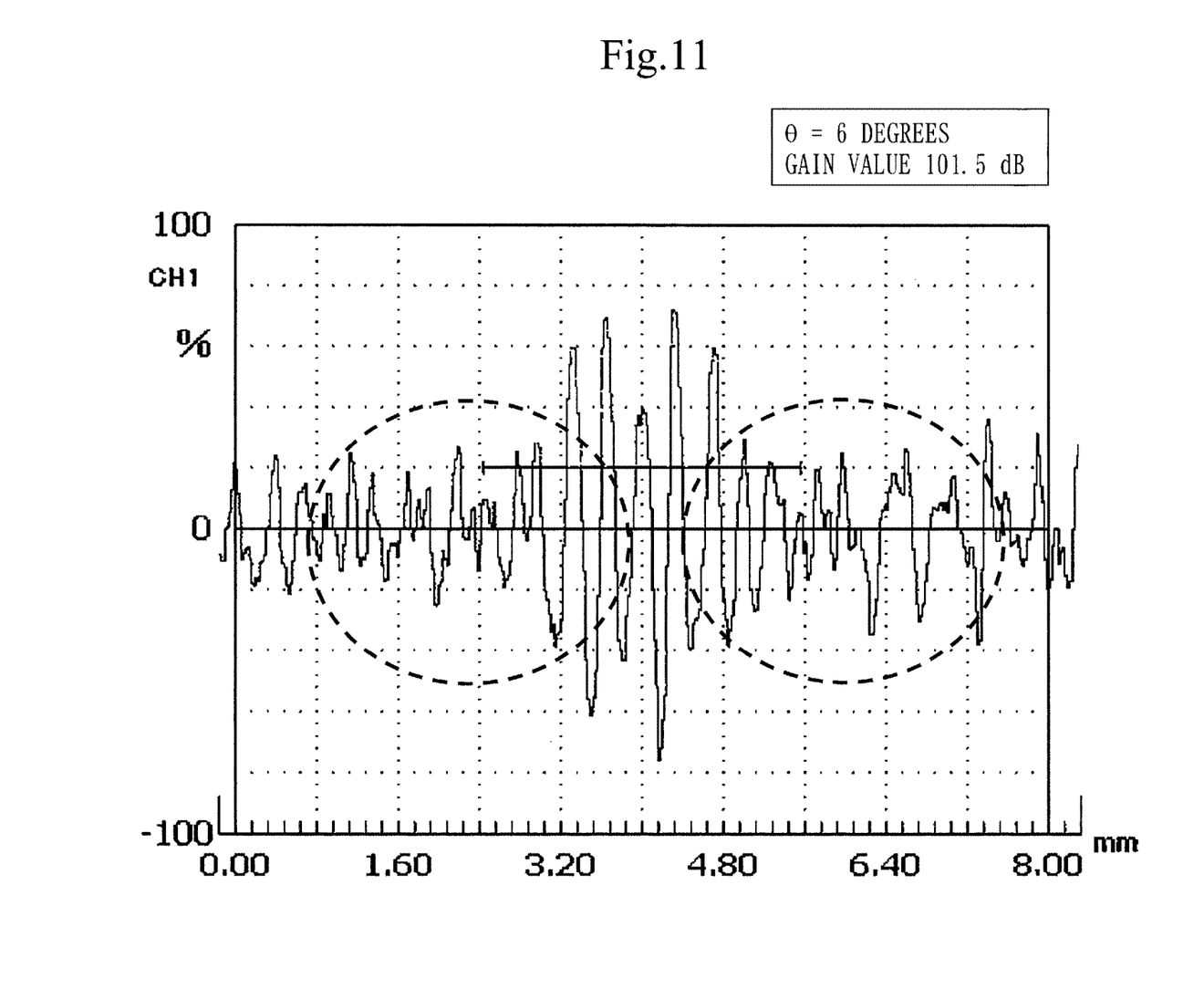
FIG. 11 is a diagram of the first embodiment and illustrates a raw waveform with a gain value of 101.5 dB when the inclination angle θ is 6 degrees.

FIG. 11 indicates a raw waveform with a gain value of 101.5 dB on which FFT analysis when the inclination angle θ is 6 degrees is based.

As indicated in FIG. 5, the frequencies decrease as the inclination angle θ increases gradually from zero degrees. In particular, the upper limit frequency decreases. Therefore, as a method for determining whether the contact state between the probe and the bolt is normal, a decrease in the frequency in FFT analysis results can be used.

As can be seen from FIGS. 6, 7, 8, and 9 in which the inclination angle θ is 0 degrees, 3 degrees, 4 degrees, and 6 degrees, respectively, frequency bands appear on both sides of the power spectrum when the inclination angle θ increases gradually from 0 degrees, as indicated by dotted circles in FIGS. 7 to 9. These frequency bands at the both sides can be used as the method for determining whether the contact state between the probe and the bolt is normal.

As can be seen from FIGS. 10 and 11 indicating the raw data when the inclination angle θ is 0 degrees and 6 degrees, respectively, the level of a reflected wave decreases as the inclination angle θ increases gradually from 0 degrees and the noise level increases as a result of increasing the gain value, as indicated by dotted circles. The gain value of FIG. 10 is 71.5 dB, and the gain value of FIG. 11 is 101.5 dB. This increase in the noise level associated with an increase in the inclination angle θ can be used as the method for determining whether the contact state between the probe and the bolt is normal.

The height of an echo can also be used as the method for determining whether the contact state between the probe and the bolt is normal.

Furthermore, the contact state determination unit 112 can adopt the following determination methods as the method for determining whether the contact state between the probe and the bolt is normal. The contact state determination unit 112 can adopt the following determination methods (1) to (3) for the comparison data 131 (A) to (D) described in step S14.

(1) The contact state determination unit 112 compares the echo data 111A with the comparison data 131 in terms of {upper limit frequency, center frequency, peak frequency, and lower limit frequency}.

(2) As the method for determining whether the contact state between the probe and the bolt is normal, "a difference between the peak frequency and the upper limit frequency and a difference between the peak frequency and the lower limit frequency" in FIG. 5 are used. That is, the contact state determination unit 112 makes a determination by comparing the echo data 111A with the comparison data 131 in terms of "a difference between the peak frequency and the upper limit frequency and a difference between the peak frequency and the lower limit frequency".

(3) The contact state determination unit 112 makes a determination by comparing the frequency spectrum of the echo data 111A with the frequency spectrum of the comparison data 131.

The ultrasound transmitting and receiving device 100 of the first embodiment determines whether the contact state between a probe and a bolt is normal, so that a determination by human work by a skilled operator is not necessary. Therefore, the axial forces of bolts can be managed stably without relying on human work.

In addition, upon determining that the contact state between a probe and a bolt is not normal, the ultrasound transmitting and receiving device 100 transmits an anomaly signal to the nut runner control device 620, so that the bolt can be prevented from being tightened when the contact state between the probe and the bolt is not normal.

Figure 12:
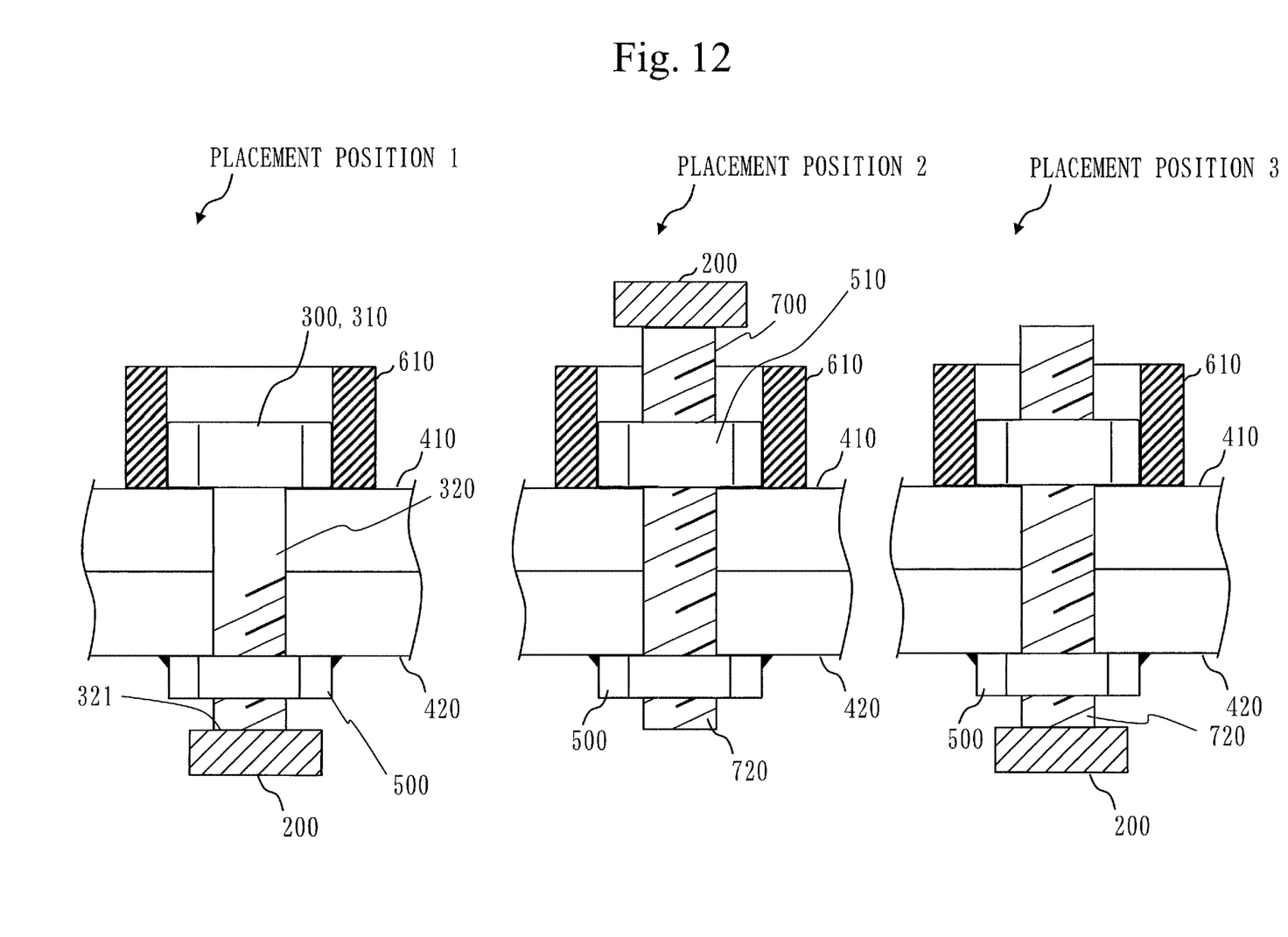
FIG. 12 is a diagram of the first embodiment and illustrates variations of a placement position of a probe 200.

FIG. 12 illustrates variations of a placement position of the probe 200. In FIG. 1, the probe 200 is placed on the bolt head 310. However, as illustrated in a placement position 1 of FIG. 12, the probe 200 may be placed under the bolt bottom portion 321. In this case, an echo detected by the probe 200 is an echo reverberated by the bolt head 310. In FIG. 1, the contact state between the probe 200 and the bolt head 310 is determined. However, as illustrated in a placement position 2, the probe 200 may be placed on a bolt 700 without the bolt head 310. In the placement position 2, the probe 200 is placed on one end face of a bolt axis 720. The bolt 700 is tightened with the nut 500 and a nut 510. Alternatively, as indicated in a placement position 3, the probe 200 may be placed under an end face of the other end of the bolt axis 720 in contrast to the placement position 2.

The ultrasound transmitting and receiving device 100 of the first embodiment uses FFT analysis results on the waveform of an echo, as described above. The contact state determination unit 112 uses the comparison data 131, which is FFT analysis results arranged in a database, to compare the echo data 111A with the comparison data 131 so as to determine the contact state of the probe 200.

In the ultrasound transmitting and receiving device 100, the contact state determination unit 112 determines the contact state not only at placement of a probe before measurement of an axial force, but also during measurement of an axial force of a bolt. That is, the steps after step 12 of FIG. 3 are performed not only at placement of a probe before measurement of an axial force, but also during measurement of an axial force of a bolt.

REFERENCE SIGNS LIST

100: ultrasound transmitting and receiving device; 101: ultrasound transmitting and receiving program; 110: processor; 111: probe control unit; 111A: echo data; 112: contact state determination unit; 112A: comparison result signal; 120: main storage device; 130: auxiliary storage device; 131: comparison data; 140: transmitting and receiving device; 200: probe; 210: contact medium; 300: bolt; 310: bolt head; 320: bolt axis; 321: bolt bottom portion; 410: first member; 420: second member; 500, 510: nut; 610: nut runner; 620: nut runner control device; 700: bolt; 720: bolt axis; 810: test probe; 820: test bolt.

The invention claimed is:

1. An ultrasound transmitting and receiving device comprising: circuitry to cause a probe to transmit ultrasound to a bolt, and cause the probe to receive an echo of the transmitted ultrasound; and a memory to store one or more pieces of comparison data to be compared with echo data that is based on the echo received by the probe, wherein the circuitry compares the echo data with the one or more pieces of comparison data, and determines a contact state between the probe and the bolt based on a comparison result, the echo data being obtained as a result of applying signal processing on a waveform of the received echo, and wherein the one or more pieces of comparison data comprises data expected to be obtained as a result of applying the signal processing on the waveform of the received echo under at least one of: a normal operational condition of the ultrasound, and an abnormal operational condition of the ultrasound.

2. The ultrasound transmitting and receiving device according to claim 1, wherein upon determining that the contact state between the probe and the bolt is not normal, the circuitry outputs a comparison result signal indicating the comparison result to a nut runner that tightens the bolt.

3. The ultrasound transmitting and receiving device according to claim 1, wherein the memory stores, as the comparison data, at least one of data expected to be obtained under a condition of a normal contact state between the probe and a bolt, and data expected to be obtained under a condition of an abnormal contact state of the probe.

4. The ultrasound transmitting and receiving device according to claim 2, wherein the memory stores, as the comparison data, at least one of data expected to be obtained under a condition of a normal contact state between the probe and a bolt, and data expected to be obtained under a condition of an abnormal contact state of the probe.

5. The ultrasound transmitting and receiving device according to claim 1, wherein the memory stores, as the comparison data, FFT analysis data obtained by analyzing a frequency characteristic of an echo of ultrasound by a fast Fourier transform, and wherein the circuitry analyzes a frequency characteristic of the echo received by the probe by a fast Fourier transform, and generates an analysis result as the echo data.

6. The ultrasound transmitting and receiving device according to claim 2, wherein the memory stores, as the comparison data, FFT analysis data obtained by analyzing a frequency characteristic of an echo of ultrasound by a fast Fourier transform, and wherein the circuitry analyzes a frequency characteristic of the echo received by the probe by a fast Fourier transform, and generates an analysis result as the echo data.

7. The ultrasound transmitting and receiving device according to claim 3, wherein the memory stores, as the comparison data, FFT analysis data obtained by analyzing a frequency characteristic of an echo of ultrasound by a fast Fourier transform, and wherein the circuitry analyzes a frequency characteristic of the echo received by the probe by a fast Fourier transform, and generates an analysis result as the echo data.

8. The ultrasound transmitting and receiving device according to claim 4, wherein the memory stores, as the comparison data, FFT analysis data obtained by analyzing a frequency characteristic of an echo of ultrasound by a fast Fourier transform, and wherein the circuitry analyzes a frequency characteristic of the echo received by the probe by a fast Fourier transform, and generates an analysis result as the echo data.

9. A non-transitory computer readable medium storing an ultrasound transmitting and receiving program that causes a computer to execute:

a probe control process of causing a probe to transmit ultrasound to a bolt, and causing the probe to receive an echo of the transmitted ultrasound;

a comparison data storage process of storing one or more pieces of comparison data to be compared with echo data that is based on the echo received by the probe; and a contact state determination process of comparing the echo data with the one or more pieces of comparison data, and determining a contact state between the probe and the bolt based on a comparison result, the echo data being obtained as a result of applying signal processing on a waveform of the received echo, and wherein the one or more pieces of comparison data comprises data expected to be obtained as a result of applying the signal processing on the waveform of the received echo under at least one of: a normal operational condition of the ultrasound, and an abnormal operational condition of the ultrasound.

* * * * *